United States Patent
Trim et al.

(10) Patent No.: US 11,455,886 B2
(45) Date of Patent: Sep. 27, 2022

(54) DYNAMIC VEHICULAR PASSAGEWAY INFORMATION USING AD-HOC NETWORK AND TEMPLATIZED CONNECTION

(71) Applicant: INTERNATIONAL BUSINESS MACHINES CORPORATION, Armonk, NY (US)

(72) Inventors: Craig M. Trim, Ventura, CA (US); Rashida A. Hodge, San Francisco, CA (US); Gandhi Sivakumar, Melbourne (AU); Kushal S. Patel, Pune (IN); Sarvesh S. Patel, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/180,966

(22) Filed: Feb. 22, 2021

(65) Prior Publication Data
US 2022/0270479 A1  Aug. 25, 2022

(51) Int. Cl.
  *G08G 1/07* (2006.01)
  *H04W 4/44* (2018.01)
  *H04W 84/18* (2009.01)

(52) U.S. Cl.
  CPC .............. *G08G 1/07* (2013.01); *H04W 4/44* (2018.02); *H04W 84/18* (2013.01)

(58) Field of Classification Search
  CPC .... B60K 35/00; B60K 37/02; B60K 31/0058; B60K 31/185; B60K 2370/151;
  (Continued)

(56) References Cited

U.S. PATENT DOCUMENTS

| | | | |
|---|---|---|---|
| 6,405,132 B1* | 6/2002 | Breed | G05D 1/0274 |
| | | | 701/45 |
| 7,047,130 B2* | 5/2006 | Watanabe | G08G 1/096844 |
| | | | 701/117 |

(Continued)

FOREIGN PATENT DOCUMENTS

| EP | 3224104 | 6/2016 |
|---|---|---|
| WO | 2016083518 | 6/2016 |

OTHER PUBLICATIONS

Danilo Amendola et al., "5G Carmen Use Cases and Requirements", 5G PPP and HORIZON 2020, May 13, 2019, 34 pages.

(Continued)

*Primary Examiner* — Daniel Previl
(74) *Attorney, Agent, or Firm* — Brian Restauro; Andrew D. Wright; Roberts Calderon Safran & Cole, P.C.

(57) ABSTRACT

A method includes receiving over a first dedicated traffic channel, DTCH parameters for a second DTCH from a first information providing device; broadcasting a connect command to a second information providing device to establish the second DTCH between the computing device and the second information providing device in a single communication handshake, the connect command comprising the DTCH parameters; receiving over the second DTCH, an electronic traffic signal associated with an area of a vehicular passageway associated with the second information providing device; determining from the electronic traffic signal, a predetermined value of a vehicular passageway parameter associated with the area; comparing the predetermined value with a current vehicle value of the vehicular passageway parameter; generating a command to display an indication in a vehicle as a result of the comparing; and transmitting the command to a display in the vehicle.

20 Claims, 9 Drawing Sheets

(58) Field of Classification Search
CPC ...... B60K 2370/152; B60K 2370/1876; B60K 28/06; B60K 31/047; B60K 2031/0091; B60K 2310/244; B60K 2370/119; B60K 2370/1438; B60K 2370/155; B60K 2370/186; B60K 2370/21; B60K 2370/27; B60K 2370/29; B60K 2370/333; B60K 2370/334; B60K 2370/52; B60K 31/02; B60K 1/02; B60K 2370/167; B60K 2370/168; B60K 2370/169; B60K 2370/179; B60K 2370/191; B60K 2370/33; B60K 31/0008; B60K 31/042; B60K 31/18; B60K 6/445; B60W 2555/60; B60W 30/146; B60W 50/14; B60W 2556/50; B60W 2720/10; B60W 2520/10; B60W 2050/143; B60W 2050/146; B60W 10/18; B60W 2540/10; B60W 2552/05; B60W 30/143; B60W 10/04; B60W 2554/00; B60W 2554/80; B60W 2720/103; B60W 40/105; B60W 10/06; B60W 10/184; B60W 10/20; B60W 2420/42; B60W 2520/105; B60W 2552/15; B60W 2554/804; B60W 2720/106; B60W 30/08; B60W 30/14; B60W 30/18; B60W 50/12; B60W 50/16; B60W 10/08; B60W 10/30; B60W 2050/0014; B60W 2050/0026; B60W 2050/0043; B60W 2050/0056; B60W 2050/0063; B60W 2050/0295; B60W 2510/182; B60W 2530/10; B60W 2540/106; B60W 2540/20; B60W 2540/30; B60W 2552/00; B60W 2555/20; B60W 2556/20; B60W 2556/45; B60W 2710/0666; B60W 2710/182; B60W 2720/12; B60W 2720/30; B60W 30/16; B60W 30/18036; B60W 30/18163; B60W 30/18172; B60W 40/02; B60W 50/0097; B60W 10/10; B60W 10/26; B60W 2050/048; B60W 20/00; B60W 20/50; B60W 2420/52; B60W 2510/244; B60W 2520/125; B60W 2520/28; B60W 2520/30; B60W 2540/12; B60W 2540/26; B60W 2554/4041; B60W 2556/65; B60W 2710/0616; B60W 2900/00; B60W 30/10; B60W 30/18009; B60W 40/09; B60W 40/112; B60W 50/082; B60W 50/085; G01C 21/3461; G01C 21/3484; G01C 21/3697; G01C 21/3691; G01C 21/26; G01C 21/3415; G01C 21/3469; G01C 21/3446; G01C 21/3492; G01C 21/367; G01C 21/3407; G08G 1/096716; G08G 1/096791; G08G 1/0112; G08G 1/096775; G08G 1/096827; G08G 1/096838; G08G 1/205; G08G 1/0129; G08G 1/09675; G08G 1/096816; G08G 1/0104; G08G 1/012; G08G 1/0133; G08G 1/0141; G08G 1/052; G08G 1/0962; G08G 1/096725; G08G 1/096783; G08G 1/167; G08G 1/0965; G08G 1/017; G08G 1/04; G08G 1/054; G08G 1/093; G08G 1/096741; G08G 1/096844; G08G 1/096861; G08G 1/165; G08G 1/20; G08G 1/01; G08G 1/09623; G08G 1/09626; G08G 1/096894; G08G 1/163; H04L 67/12; H04L 67/02; G07C 5/008; G07C 5/02; G07C 5/0825; G07C 5/0866; G07C 5/006; G07C 5/0808; G07C 5/0858; G06Q 10/0631; G06Q 10/06311; G06Q 10/087; G06Q 40/08; G06Q 10/0635; G06Q 30/0207; G06Q 10/04; G06Q 30/0224; G06Q 50/30; G06Q 10/047; G06Q 30/0259; G06Q 30/0261; G06Q 30/0639; G06Q 10/0639; G06Q 10/08355; G06Q 10/20; G06Q 50/265; G01D 11/28; G01D 3/08
USPC ................ 340/907, 932, 933, 941, 909–911, 340/917–919, 931, 969, 973, 994, 995.13, 340/426.22
See application file for complete search history.

(56) References Cited

U.S. PATENT DOCUMENTS

| 8,818,725 | B2 | 8/2014 | Ricci |
| 9,646,496 | B1 | 5/2017 | Miller |
| 10,292,130 | B2 | 5/2019 | Lee et al. |
| 10,499,277 | B2 | 12/2019 | Kimura et al. |
| 2005/0132024 | A1 | 6/2005 | Habaguchi et al. |
| 2008/0238721 | A1* | 10/2008 | Roberts ............... G08G 1/0104 340/932 |
| 2010/0331023 | A1 | 12/2010 | Cai et al. |
| 2019/0154143 | A1* | 5/2019 | Ganske .................. F16H 59/66 |
| 2020/0053577 | A1* | 2/2020 | Sundar ................... H04W 4/44 |
| 2020/0137769 | A1* | 4/2020 | Sun .................... H04W 72/1242 |
| 2020/0178048 | A1* | 6/2020 | Kim .................... H04W 12/062 |

OTHER PUBLICATIONS

Mell et al., "The NIST Definition of Cloud Computing", NIST, Special Publication 800-145, Sep. 2011, 7 pages.
Garcia et al., "Vehicle Detection Based on Laser Radar", EUROCAST 2009, LNCS 5717, Published in 2009, pp. 391-397. Abstract.
Edwards, "Vehicular Ad-hoc Networks", 5G Research Centre (5GRC), Published date unknown, 2 pages.
Sangani, "Honda Cars partners with IBM Watson to enhance 'Honda Connect", Economic Times, May 29, 2017, 1 page.

* cited by examiner

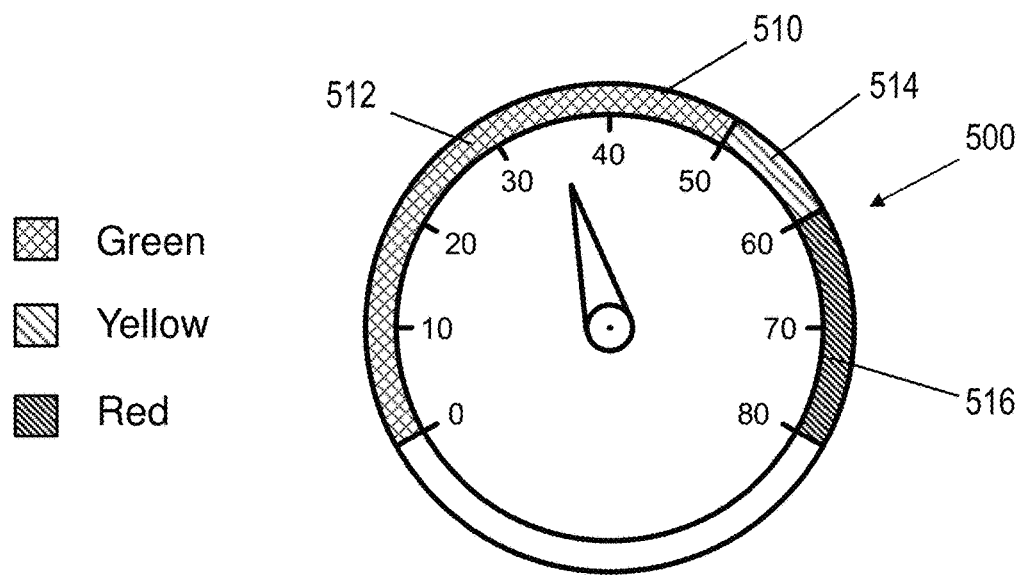
FIG. 5
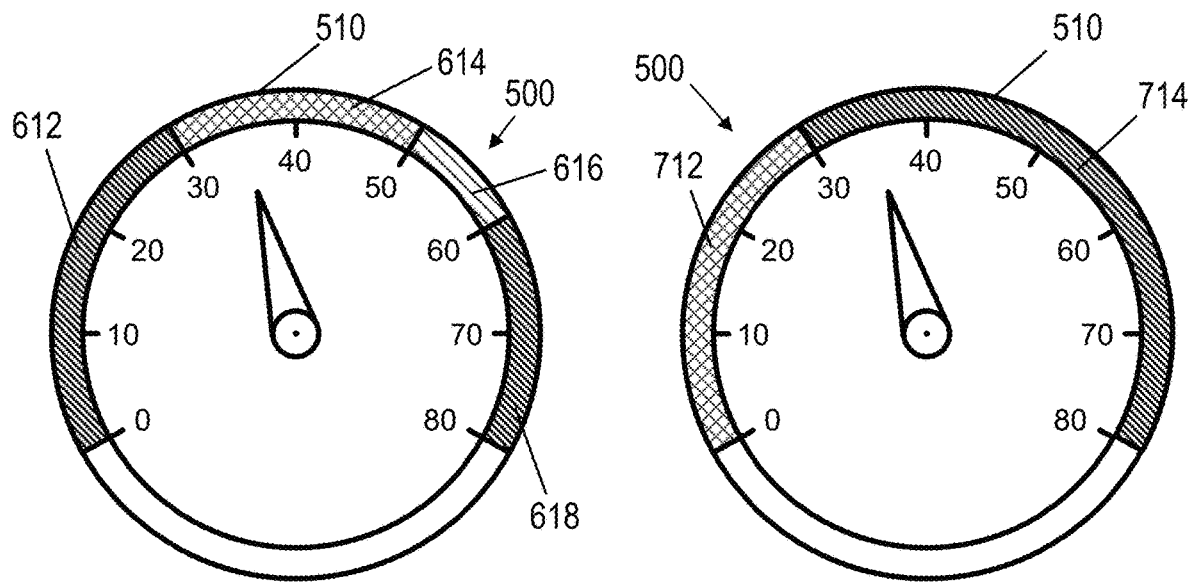
FIG. 6  FIG. 7

```
                    <TYPE>DTCH </TYPE>
              <DIRECTION> Bidirectional </DIRECTION>
                      <QCI> XXX </QCI>
                <BW_ALLOC> XXX </BW_ALLOC>
                <ERR_RATE> XXX </ERR_RATE>
          <COMM_INTERFACE> MAC </COMM_INTERFACE>
              <AUTH_USERS> ALL </AUTH_USERS>
              <CONN_TYPE> AD_HOC </CONN_TYPE>
      <MAX_REVE_DATA_SEG> XXX </MAX_REVE_DATA_SEG>
                    <UNIT> bytes </UNIT>
      <PACKET_COMPRESSION> disabled </PACKET_COMPRESSION>
                     <ALLIGN> no <ALLIGN>
                              ...
                              ...
```

FIG. 10

DYNAMIC VEHICULAR PASSAGEWAY INFORMATION USING AD-HOC NETWORK AND TEMPLATIZED CONNECTION

BACKGROUND

Aspects of the present invention relate generally to vehicular traffic information and, more particularly, to using wireless communication systems with high data transfer rates to facilitate a vehicle driver receiving current information regarding traffic conditions.

Fifth generation (5G) wireless communication is intended to provide much higher data rates and much lower end-to-end over-the-air (OTA) latency. Some prospective applications for the 5G (besides the traditional cellular communications) are wireless virtual reality (VR), Augmented Reality (AR), and Device to Device (D2D) communications in the network edges.

SUMMARY

In a first aspect of the invention, there is a computer-implemented method including: receiving, by a computing device and over a first dedicated traffic channel, dedicated traffic channel parameters for a second dedicated traffic channel from a first information providing device; broadcasting, by the computing device, a connect command to a second information providing device to establish the second dedicated traffic channel between the computing device and the second information providing device in a single communication handshake, the connect command comprising the dedicated traffic channel parameters; receiving, by the computing device and over the second dedicated traffic channel, an electronic traffic signal, the electronic traffic signal being associated with an area of a vehicular passageway associated with the second information providing device; determining, by the computing device and from the electronic traffic signal, a predetermined value of a vehicular passageway parameter associated with the area; comparing, by the computing device, the predetermined value with a vehicle value of the vehicular passageway parameter, the vehicle value being a current value of the vehicular passageway parameter associated with a vehicle; generating, by the computing device, a command to display an indication in the vehicle as a result of the comparing; and transmitting, by the computing device, the command to a display in the vehicle.

In another aspect of the invention, there is a computer program product including one or more computer readable storage media having program instructions collectively stored on the one or more computer readable storage media. The program instructions are executable to: receive, from a first information providing device and over a first dedicated traffic channel, dedicated traffic channel parameters for a second dedicated traffic channel; broadcast a connect command to a second information providing device to establish the second dedicated traffic channel between a vehicle device and the second information providing device in a single communication handshake, the connect command comprising the dedicated traffic channel parameters; receive over the second dedicated traffic channel an electronic traffic signal, the electronic traffic signal being associated with an area of a vehicular passageway associated with the second information providing device; determine from the electronic traffic signal, a predetermined value of a vehicular passageway parameter associated with the area; compare the predetermined value with a vehicle value of the vehicular passageway parameter, the vehicle value being a current value of the vehicular passageway parameter associated with a vehicle; and generate a command to display an indication in the vehicle as a result of the comparing.

In another aspect of the invention, there is system including a processor, a computer readable memory, one or more computer readable storage media, and program instructions collectively stored on the one or more computer readable storage media. The program instructions are executable to: receive a connect command from a vehicle device to establish a current dedicated traffic channel with the vehicle device in a single communication handshake, the connect command comprising dedicated traffic channel parameters for the current dedicated traffic channel; establish the current dedicated traffic channel; transmit over the current dedicated traffic channel an electronic traffic signal, the electronic traffic signal being associated with an area of a vehicular passageway and comprising a predetermined value of a vehicular passageway parameter associated with the area; and transmit, over the current dedicated traffic channel, dedicated traffic channel parameters for a subsequent dedicated traffic channel.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 5 shows an exemplary speedometer indicating an operating range in accordance with aspects of the invention.

FIG. 6 shows an exemplary speedometer indicating an operating range in accordance with aspects of the invention.

FIG. 7 shows an exemplary speedometer indicating an operating range in accordance with aspects of the invention.

FIG. 10 shows an exemplary DTCH parameter template in accordance with embodiments of the present invention.

DETAILED DESCRIPTION

Figure 1:
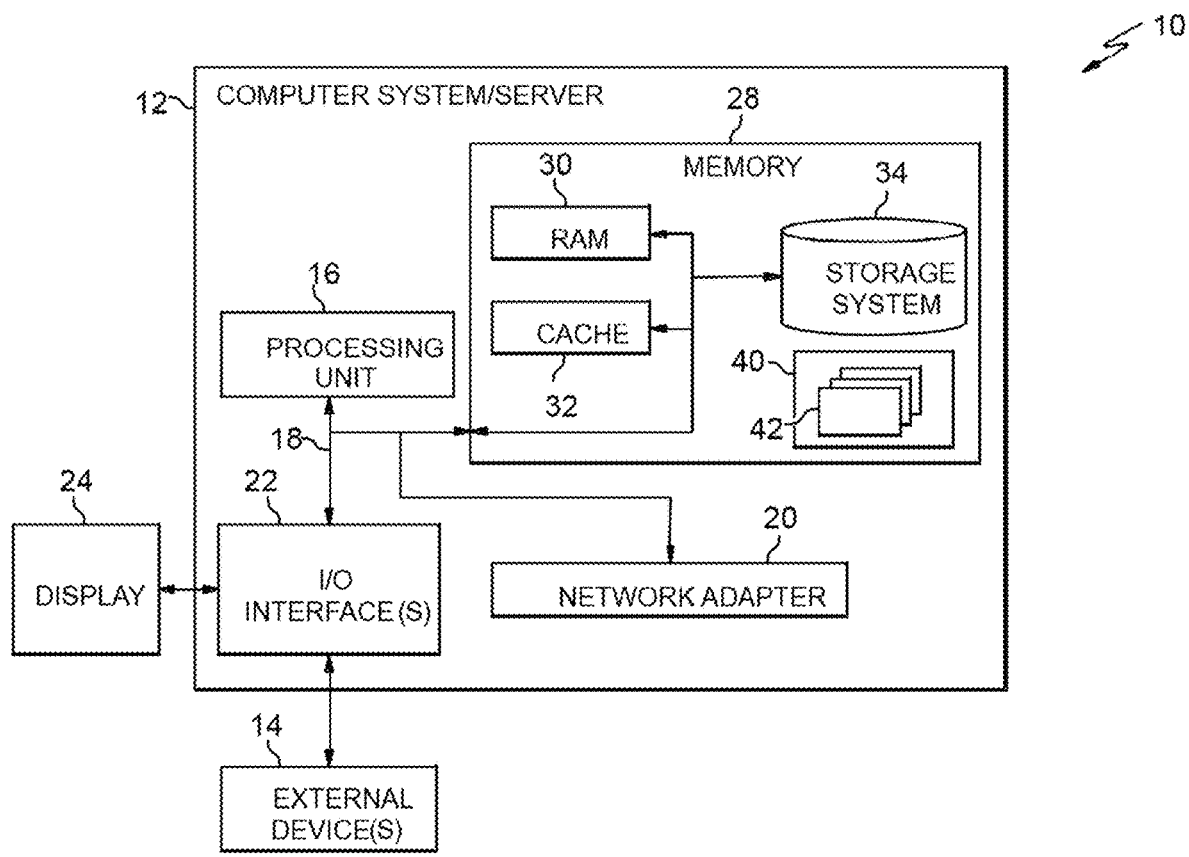
FIG. 1 depicts a cloud computing node according to an embodiment of the present invention.

Aspects of the present invention relate generally to vehicular traffic information and, more particularly, to using wireless communication systems with high data transfer rates to facilitate a vehicle driver receiving current information regarding traffic conditions. Embodiments of the invention provide, for example, dynamic roadway information such as, for example, speed information that is adjusted for vehicle location and/or driving conditions. For example, embodiments of the invention provide to a vehicle an appropriate speed range for the particular lane of the roadway in which the vehicle is located. Embodiments provide different speed ranges for different lanes of the same roadway and/or different weather conditions. In embodiments, the vehicle connects to a plurality of roadside information providing devices as the vehicle moves along the roadway. Embodiments use templatized connection over an ad-hoc network of a 5G wireless network to minimize the time required to connect the vehicle to the various roadside information providing devices (such as, for example, road milestone or speed limit signs). In embodiments, the speed range information is displayed on the speedometer of the vehicle as acceptable, warning, and unacceptable speed ranges, using a different color for each speed range. In this way, the driver of the vehicle quickly and easily determines if they are traveling at an appropriate speed for the current lane and/or weather conditions. In embodiments, the indication includes a first indication for a first lane of the vehicular passageway and a second indication for a second lane of the vehicular passageway, and the first indication and the second indication are different for a same value of the vehicular passageway parameter. In this manner, implementations of the invention provide lane-specific indications/notifications to the driver of the vehicle regarding proper speed ranges for the various lanes of the vehicular passageway. In embodiments, the term vehicular passageway includes roads, highways, trails, and any other passageway over or on which a vehicle travels.

Embodiments comprise provisioning of the 5G-enabled speed limit sign boards on a road, broadcasting the distinguished speed limits based on the vehicle category and the lane in the pre-defined boundary area. Embodiments further comprise initialization of a 5G dynamic ad-hoc network by the speed limit sign boards on the road, sending continuous OPEN CONNECT requests in the boundary area of the sign board over a 5G paging control channel (PCCH). Embodiments comprise sending a TEMPLATIZE_CONNECT command from a vehicle mounted device to establish a dedicated traffic channel (DTCH) with a single communication handshake. In embodiments, the DTCH connect request has all the parameters already negotiated based on information received at priors sign boards. In embodiments, when the sign board is connected to the virtualized network function (VNF) of the vehicle, with the speed information, it sends the DTCH parameters of the next sign board's ad-hoc network. As a result, once the current ad-hoc network is disconnected, then the vehicle starts broadcasting CONNECT with TEMPLATE received from the previous network. In embodiments, communicating between the vehicle device VNF and the sign board VNF for exchanging the speed limit and DTCH_TEMPLATE for a subsequent sign board facilitates information transfer between the sign boards and the vehicle. In embodiments, data is collected from the vehicle sensors for the current speed of the vehicle, and image processing techniques are triggered to gather lane information using image filtering classifiers. Embodiments classify the information collected using hierarchical or parallel classifier along with the in-scope boundary definition (e.g., situation valid for few meters, a kilometer, a few kilometers). In embodiments, a boundary sensitive classification module trained for circumstances such as speed of the vehicle, type of the vehicle, nature of instruction on the board captured, and geography such as river, hilly area slope, etc. Embodiments include the ability to locate the vehicles, create an ad-hoc network of the vehicles, and selective information transfer across the dynamic ad-hoc networked devices to provide deeper information about situation, speed breach, and other related circumstances. Embodiments comprise articulation of the information based on multiple input streams such as location, type of vehicles, and lane information and accordingly trigger the speedometer to change color by sending an in-bound command over a platform message queue of the vehicle system. Embodiments comprise changing the color of the speedometer based on real time situational analysis, and/or triggering a voice controller to alert the driver of the vehicle that the vehicle is in an undesirable speed zone (extreme underspeed or overspeed situations). Embodiments comprise creation of a light weight DTCH from the sign boards to the VNF of the vehicle device, and using the light weight DTCH as a shared DTCH for all the devices in the boundary region using a universally unique identifier (UUID) based distinction for control command instruction transmission.

Implementations of the invention improve the performance of a speedometer or other display in a vehicle by creating an indication that is easily and quickly recognized by a driver of the vehicle. The indication relates the current speed of the vehicle to predetermined speed ranges for the particular location of, and the environmental conditions around, the vehicle.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
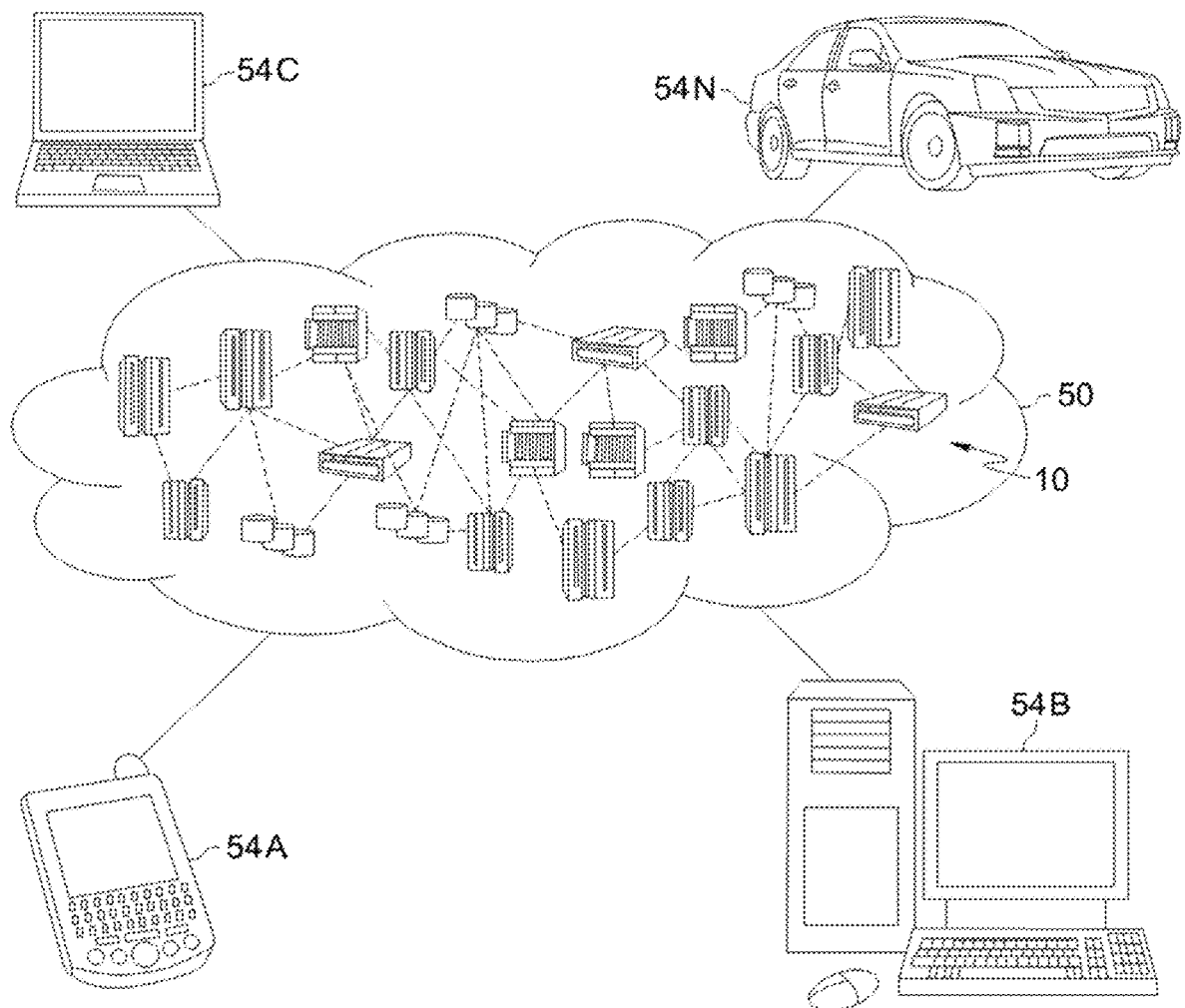
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
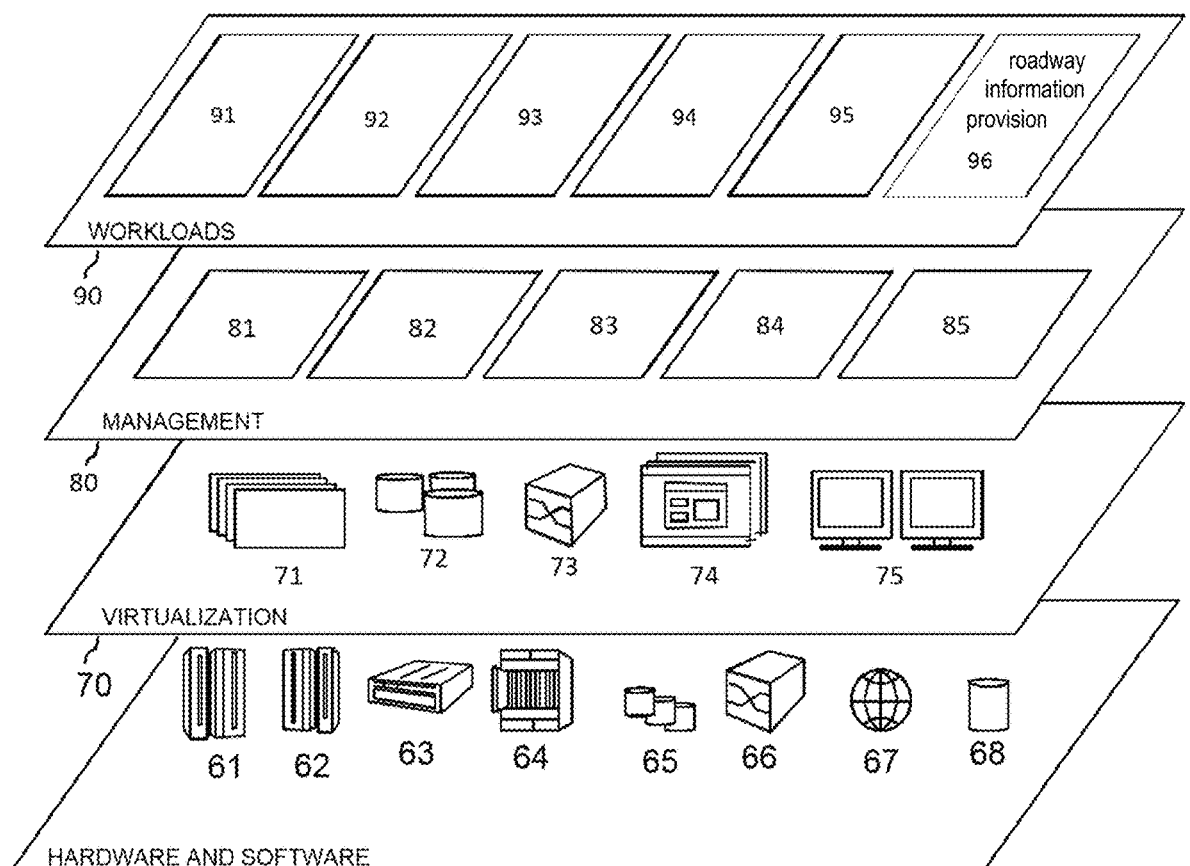
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and roadway information provision 96.

Implementations of the invention may include a computer system/server 12 of FIG. 1 in which one or more of the program modules 42 are configured to perform (or cause the computer system/server 12 to perform) one of more functions of the roadway information provision 96 of FIG. 3. For example, the one or more of the program modules 42 may be configured to: receive over a first dedicated traffic channel (DTCH), DTCH parameters for a second DTCH from a first information providing device; broadcast a connect command to a second information providing device to establish the second DTCH between the computing device and the second information providing device in a single communication handshake, the connect command comprising the DTCH parameters; receive over the second DTCH, an electronic traffic signal, the electronic traffic signal being associated with an area of a vehicular passageway associated with the second information providing device; determine from the electronic traffic signal, a predetermined value of a vehicular passageway parameter associated with the area; compare the predetermined value with a vehicle value of the vehicular passageway parameter, the vehicle value being a current value of the vehicular passageway parameter associated with the vehicle; generate a command to display an indication in the vehicle as a result of the comparing; and transmit the command to a display in the vehicle.

Speedometers in vehicles are static and do not give any information about the conditional speed limits on the road. A driver manually checks the speed symbols on the roadside and accordingly the driver adjusts the speed of the vehicle. Further, there is no mechanism which can tell the driver autonomously to increase/decrease vehicle speed based on its current lane location. For example, a driver manually checks for the appropriate speed (based on driving knowledge and/or by looking to speed limit signs). A driver in the fastest lane of a highway may be driving too slowly because they missed seeing a speed limit sign. This may result into a bad situation such as, for example, a vehicle collision. Hence, there is a need for speed limit information to be available to the driver on, for example, the vehicle's speedometer, and for the information to be quickly and easily deciphered.

There is a need for dynamically collecting speed related information using resources placed on roadside speed limit signs and other speed related information like the presence of speed bumps, etc., and for providing an easily readable way to notify the driver of this information.

Currently, there is no system for collecting speed related information (or other vehicular traffic information) from roadside resources, automatically broadcasting by Internet of Things (IoT) enabled devices on the roadside, and providing information about the driving environment and regulations regarding vehicle speed. A driver could benefit if this information is used to provide insight regarding the driving environment and this insight is transferred to the driver using a display that is easy to see and understand. Also, selective information exchange in the defined geographical boundaries of the IoT enabled road signs is currently missing. Such localized information exchange would increase the efficiency of providing the information to the driver using selective multicast operation according to embodiments of the invention using a 5G dynamic ad-hoc network.

Embodiments provide a system working in a Virtual Network Function (VNF) of a 5G dynamic ad-hoc network while co-existing with existing mobility monitoring tools. Embodiments detect information in IoT enabled roadside devices (such as road signs, milestones, and security instruction signs) while the vehicle is running on the road using 4G and compatible platforms. Embodiments identify insights from data collected from IoT enabled devices located along the road. The software defined networking in the 5G VNF creates the ad-hoc network of the vehicles and the IoT enabled roadside devices and establishes the device network connectivity.

Embodiments provide a mechanism that works with a 5G dynamic ad-hoc network between devices mounted on vehicles and speed limit signs (or other roadside devices), articulates the correct speed characteristics based on the collected situational insights, and displays the speed characteristics (such as acceptable speed ranges) using an easily recognizable display on the speedometer of the vehicle. For simplicity, the term "roadside devices" is used to represent speed limit signs or any other roadside device in accordance with embodiments of the invention. Embodiments comprise 5G enabled speed limit signs that continuously seek ad-hoc network connection requests over a 5G paging control channel (PCCH) from other devices (such as vehicle devices) and pair with the other devices when the other devices are in the designated boundary area of the road sign. For simplicity, the term "vehicle device" is be used to represent a device mounted in or on a vehicle in accordance with embodiments of the invention. In embodiments, the vehicle devices push the connection requests to form a dynamic ad-hoc network using a 5G dedicated control channel (DCCH) to the supported ad-hoc network edge region of millimeter waves. Once the communication is established between the roadside device and the vehicle device, a dedicated logical channel (for example, a DTCH) is established between the roadside device and the vehicle device for data transfer and a characteristics exchange is performed. Embodiments create a DTCH template to be used for parameter negotiation which is used between the vehicle device and the 5G-enabled roadside device to form the DTCH. As all the parameters are fetched from the template, the DTCH establishment is faster and is real time operational in running vehicles. The roadside device continues to broadcast speed limits over the DTCH. The information collection and articulation are done at the vehicle device's VNF. The VNF orchestrator of the 5G network at the vehicle collects the broadcasted information and accordingly updates the speed limits used by the vehicle device.

Embodiments collect lane information from existing image processing platforms on the vehicle. In embodiments, the vehicle device triggers a camera associated with the vehicle device and determines the lane of the vehicle based on, for example, image processing filters. The vehicle device considers the lane information during the speed limit determination and accordingly triggers a display (such as a speedometer) with color codes. The color codes of the speed limits are configured based on de-facto standards wherein red indicates the speeds that are not allowed, yellow indicates a border between speeds that are not allowed and an allowed speeds, and green indicates allowed speeds. Embodiments selectively trigger an audible or tactile indication to alert the driver of a current speed that is either not allowed or is in the border. In embodiments, the vehicle device invokes natural language actuators to communicate the audible indication to attract driver's attention. As the information is collected and displayed on the vehicle speedometer (or other display of indication), it becomes easier for the driver to interpret the information.

As an example, a driver is driving a car in the left (fastest) lane on a road and missed seeing a sign indicating "Minimum speed is 40 miles per hour (MPH) in left lane". This results in a situation of congestion (or other undesirable events) in the left lane. Since the driver did not see the sign, the driver does not know the minimum speed for the lane he/she is in. In embodiments, a vehicle device will automatically sense the response of the sign and update a color code on the speedometer (or other display or indicating device) accordingly. As a result, the driver sees the permissible speed range at any point and lane on the road as the vehicle device dynamically and proactively captures the permissible speed ranges and provides time-based speed ranges to the driver. In embodiments, when the driver is operating in the red zone, the vehicle device communicates with the driver in natural language such as, for example, "please increase speed, you should be at a minimum of 40 miles per hour in this lane" or "please change lanes as the minimum speed in this lane is 40 miles per hour". In embodiments, when the driver is operating in the red zone, the vehicle device communicates with the driver in natural language such as, for example, "please decrease your speed, you should be at a maximum of 60 miles per hour in this lane" or "please change lanes as the maximum speed in this lane is 60 miles per hour".

Embodiments of the invention provide a driver with speed limit information on the vehicle dashboard with runtime situational analysis. Embodiments collect current lane information, hence become more location relevant and accordingly the speed is updated on the speedometer dynamically to provide better usability. In embodiments, the 5G ad-hoc network is used to broadcast allowable speed ranges and templatized DTCH creation is done, resulting in a real-time 5G network being used with ad-hoc VNF for vehicles. In embodiments, the speedometer display mechanism helps a driver recognize proper speed ranges and voice-based support is additional to attract the driver's attention. Embodiments help drivers maintain an allowable or preferable speed of the vehicle. Embodiments apply to auto-driving vehicles to control the speed of the vehicle in particular modes. As a result of the DTCH bandwidth and the connection parameters being templatized for the ad-hoc network, eNodeB service orchestration is not required because a VNF at the vehicle device can make the connections.

Figure 4:
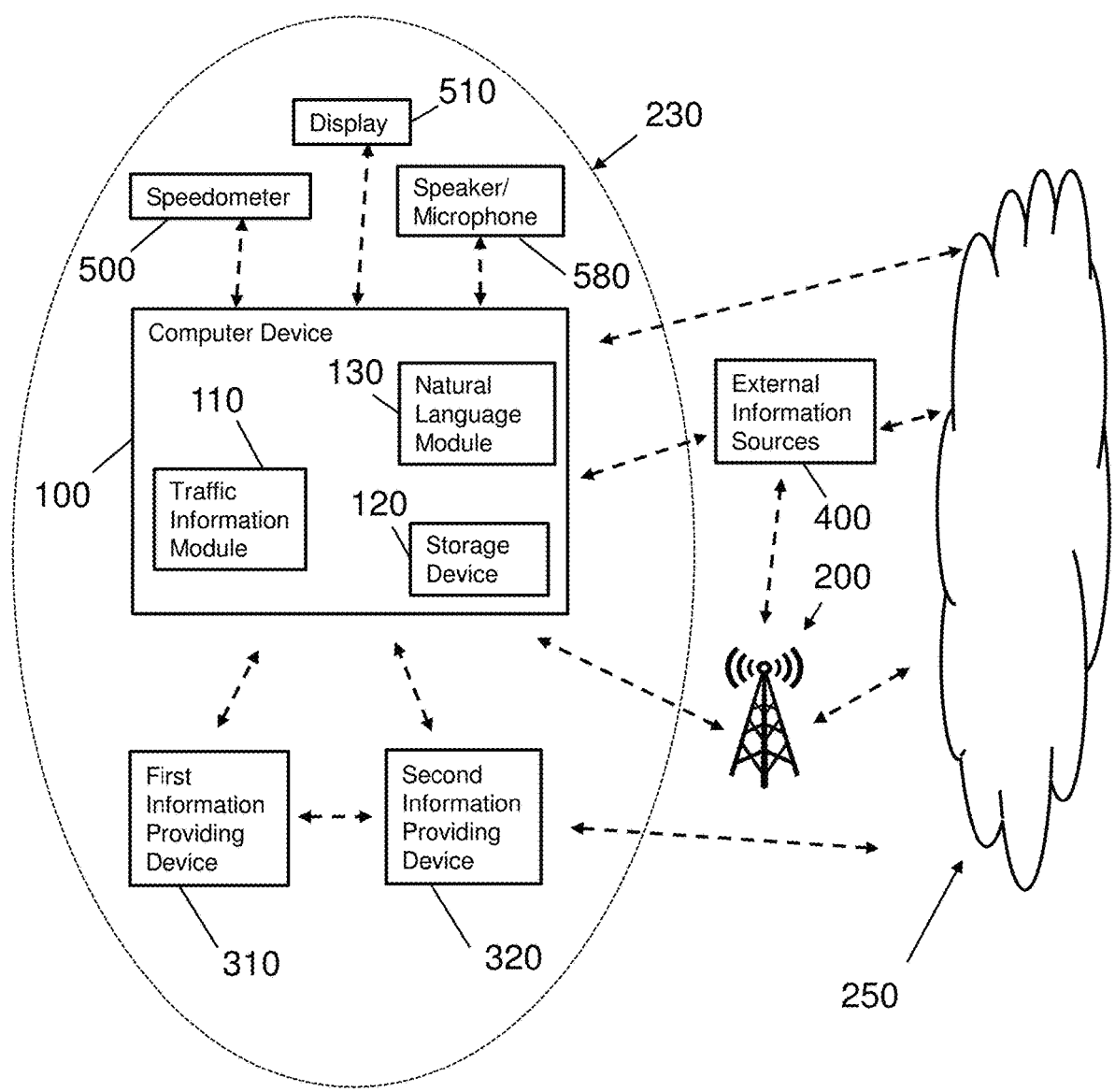
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks such as wireless network 200. In embodiments, wireless network 200 is a fifth generation (5G) cellular network. In embodiments, a plurality of information providing devices, such as, for example, a first information providing device 310 and a second information providing device 320, communicate with computing device 100 directly over an ad-hoc network 230 created by two or more of computer device 100, first information providing device 310, and second information providing device 320. In embodiments, some or all of computing device 100, first information providing device 310, second information providing device 320, and wireless network 200 communicate over one or more networks 250 such as, for example, cloud computing environment 50. In embodiments, first information providing device 310 and/or second information providing device 320 is a stationary device. In this example, computer device 100 includes a traffic information module 110, for example, one or more of program modules 42 in FIG. 1, and a storage device 120 such as, for example, storage system 34 in FIG. 1. FIG. 4 also shows external information sources 400 such as, for example, storage system 34 in FIG. 1, that computer device 100 accesses through network 250. In embodiments, computer device 100 receives external information (such as, for example, global positioning system location information, weather information, speed limit information, road hazard information, etc.) from external information sources 400 directly, over wireless network 200, and/or over network 250.

In embodiments, computer device 100 comprises natural language module 130, which may comprise one or more program modules such as program modules 42 described with respect to FIG. 1. In embodiments, natural language module 130 generates natural language audible communications and presents them to the driver over a speaker/microphone 580 to advise the driver of, for example, the speed range in which the vehicle is currently traveling. In embodiments, computer device 100 transmits a command to speaker/microphone 580 to produce a natural language audible message in a vehicle (such as, for example, vehicle 860 in FIG. 8). Other examples of audible communications are described above. In embodiments, natural language module 130 interprets words and phrase spoken by the driver and received by speaker/microphone 580 and, when appropriate, traffic information module 110 (or another module) performs an operation based on the interpretation. As a non-limiting example, in embodiments, as a result of the driver saying "change the warning zone to green" natural language module 130 interprets the driver's statement and relays it to traffic information module 110, which sends a command to the speedometer to change the color of the warning speed zone from yellow to green. Computer device 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

A dedicated traffic channel (DTCH) is a point-to-point channel in a wireless network dedicated to one piece of user equipment for the transfer of user information. Embodiments provide a mechanism to create a templatized DTCH in a dynamic ah-hoc network (for example, ad-hoc network 230) of 5G-enabled devices (for example, computer device 100, first information providing device 310 and second information providing device 320) and 5G-templatized paging for connecting to/creating the ad-hoc network. In embodiments, a second DTCH is established directly between computer device 100 and second information providing device 320. With a non-templatized DTCH, back and forth communication between the devices on the network is required to obtain the parameters required to establish a connection between the devices. In embodiments, a templatized DTCH is a DTCH in which the connection parameters required for connection are assembled in a template that is transmitted between devices to facilitate connection between the devices and reduce the time required to make the connection. In embodiments, all the DTCH parameters for a connection to a subsequent information providing device (for example, second information providing device 320) in the ad-hoc network are acquired by a vehicle device (for example, computer device 100) from a current information providing device (for example, first information providing device 310) to which the vehicle device is connected. In embodiments, computer device 100 receives over a first dedicated traffic channel, dedicated traffic channel parameters for a second dedicated traffic channel from first information providing device 310. In embodiments, computer device 100, broadcasts a connect command to second information providing device 320 to establish a second DTCH between computer device 100 and second information providing device 320 in a single communication handshake. In embodiments, the connect command includes the DTCH parameters needed for the second DTCH. In embodiments, the connect command is broadcast over a dedicated control channel (DCCH) between computer device 100 and second information providing device 320.

In embodiments, computer device 100 receives, over the DTCH between computer device 100 and second information providing device 320, an electronic traffic signal that is associated with an area, such as, for example, a mile marker and/or lane, of a vehicle passageway such as, for example, road 855, associated with second information providing device 320. In embodiments, the electronic traffic signal is speed limit information that is lane specific. In embodiments, computer device 100 determines from the electronic traffic signal received from second information providing device 320, a predetermined value of a vehicle passageway parameter, such as, for example, speed ranges, applicable to the area of road 855 associated with second information providing device 320.

The DTCH parameters are templatized to minimize device handshaking operation when connecting to the subsequent information providing device (for example, second information providing device 320). In embodiments, the information providing devices (for example, first information providing device 310 and second information providing device 320) are stationary speed limit signs located along a vehicle passageway such as, for example, a road. In embodiments, the 5G-enabled speed limit signs broadcast the permissible speed limits based on the vehicle type, situation, and nature of the environment. In embodiments, a speedometer of a vehicle that contains the vehicle device (for example, computer device 100) is actuated based on the information insights collected over the 5G DTCH in the ad-hoc network. Embodiments provide instructions to create or change an indicator in the vehicle (such as a color on the speedometer) based on the information received from the information providing devices. In embodiments, the information received comprises information that is specific to a particular lane on the road, a type of the vehicle, weather conditions and/or other factors. In embodiments, some or all of this information is obtained outside of the ad-hoc network through 5G logical channels (such as DTCH) connected to the 5G system. In embodiments, the indication includes an audible indication such as, for example, a natural language message or some other audible indication to attract the driver's attention.

Fifth generation (5G) wireless communication is intended to provide much higher data rates and much lower end-to-end over-the-air (OTA) latency. Some prospective applications for 5G (besides the traditional cellular communications) are wireless virtual reality (VR), Augmented Reality (AR), Device to Device (D2D) communications in the network edges, and autonomous vehicles in the Vehicular Ad-hoc Networks (VANET) which can be part of an infrastructural or infrastructure-less networks. A vehicular ad-hoc network (for example, ad-hoc network 230) not only comprises communication between the vehicles on the road, but this can be further extended to the communication between the IoT devices (for example, first information providing device 310 and second information providing device 320) placed near the road to guide the driving entity.

Millimeter wave frequencies (mmWave) are expected to have a major role in the 5G standards. They have the advantages of huge available bandwidth (several GHz) and reduced delay in the case of being used locally. With millimeter waves, it becomes easy to transmit a large amount of data to the upper layer of 5G architecture. At the same time, as 5G enables the capability of a dynamic ad-hoc network (for example, ad-hoc network 230), the data transmission becomes more optimal as some of the decisions can be taken at the ad-hoc network level. This minimizes the workload and provides the benefits of local computing wherein network latency elements can be bypassed for gaining operation performance. An ad-hoc network can be created between the devices on the road and the cognition enabled capabilities pushed to the local end (the vehicle) enables a driver to obtain insight to a current road situation. Embodiments provide a mechanism to connect the vehicular devices (for example, computer device 100) with 5G-enabled speed limiters and milestones (for example, first information providing device 310 and second information providing device 320) on the road, and accordingly update the vehicle to control the speed and update the speedometer display characteristics to get better visual sensation of speed requirements as described below. Embodiments are applicable to vehicles driven by a human and to autonomous driving vehicles.

FIGS. 5-7 show examples of a vehicle speedometer 500 in accordance with embodiments of the invention. In each of FIGS. 5-7, speedometer 500 is displaying a different situation based on lane location of the vehicle on a display 510.

In embodiments, speedometer 500 and/or display 510 receive commands from computer device 100, traffic information module 110, and/or natural language module 130 that instruct speedometer 500 and/or display 510 to indicate information (visual and/or audible) to the driver of the vehicle. In embodiments, computer device 100, traffic information module 110, and/or natural language module 130 is/are part of speedometer 500 and/or display 510. In FIGS. 5-7, display 510 shows, for example, an acceptable speed range as green, a warning speed range as yellow, and an unacceptable speed range as red. In embodiments, display 510 displays a current vehicle value of a vehicle passageway parameter, such as, for example, speed and a predetermined value (a single value or a range of values) of the vehicle passageway parameter. FIG. 5 represents a normal operating range on a single lane road, for example. An acceptable speed range 512 of 0 to 50 mph, a warning speed range 514 of 50 to 60 mph, and an unacceptable speed range 516 of above 60 mph are displayed. In embodiments, FIG. 5 represents the speed ranges that apply to clear weather during daylight. In embodiments, on a rainy day, for example, the acceptable speed range is 0 to 40 mph, the warning speed range is 40 to 50 mph, and the unacceptable speed range is above 50 mph. In FIG. 5, the vehicle is travelling at 35 mph (current vehicle value of the vehicle passageway parameter), which is in the acceptable range and shown as green. In embodiments, on a snow-covered road at night, for example, the acceptable speed range is 0 to 20 mph, the warning speed range is 20 to 25 mph, and the unacceptable speed range is above 25 mph. A vehicle travelling at 35 mph under these snow-covered road conditions would result in display 510 indicating an unacceptable speed and showing red. In embodiments, the speed range of display 510 in which the current speed exists is the only portion of display 510 that is illuminated. In embodiments, all speed ranges are always illuminated to show the driver what speeds are considered acceptable, in the warning range, and unacceptable. These ranges are only exemplary and are not to be construed as limiting. In embodiments, other combinations of environmental factors result in different speed ranges.

In embodiments, the command received by speedometer 500 and/or display 510 is to display a first color on display 510 for a current vehicle value of the vehicle passageway parameter less than the predetermined value, and to display a second color on the display for a vehicle value greater than the predetermined value. In embodiments, the command received by speedometer 500 and/or display 510 is to display a first color on display 510 for a current vehicle value in a first range of values of the vehicular passageway parameter, and display a second color on display 510 for a current vehicle value in a second range of values of the vehicular passageway parameter. In embodiments, the command received by speedometer 500 and/or display 510 is to display a first color on display 510 for a current vehicle value equal to a first value when the vehicle is located in a first lane of the vehicular passageway, and display a second color on display 510 for a current vehicle value equal to the first value when the vehicle is located in a second lane of the vehicular passageway (such as, for example, road 855 in FIG. 8).

FIG. 6 represents a normal operating range in the middle lane of a highway, for example. An acceptable speed range 614 of 30 to 50 mph, a warning speed range 616 of 50 to 60 mph, and unacceptable speed ranges 612 of 0 to 30 mph and 618 above 60 mph are displayed. Note in FIG. 6 that, in addition to a high speed range 618 that is unacceptable, there is a low speed range 612 that is also unacceptable. Maintaining traffic flow and avoiding traffic backups are reasons for having a low speed range that is unacceptable. In FIG. 6, the vehicle is travelling at 35 mph, which is in the acceptable range and shown as green. These ranges are only exemplary and are not to be construed as limiting. Embodiments include adjustments to the speed ranges based on environmental factors as discussed with regard to FIG. 5, and/or other factors such as, for example, vehicle type, driver experience, and other factors that affect appropriate vehicle speed.

FIG. 7 represents a normal operating range in the slow lane of the same highway as in FIG. 6, for example. An acceptable speed range 712 of 0 to 30 mph, and an unacceptable speed range 714 above 30 mph are displayed. In FIG. 7, the vehicle is travelling at 35 mph, which is in the unacceptable range and shown as red. These ranges are only exemplary and are not to be construed as limiting. Embodiments include adjustments to the speed ranges based on environmental factors as discussed with regard to FIGS. 5 and 6, and/or other factors such as, for example, vehicle type, driver experience, and other factors that affect appropriate vehicle speed.

As shown in FIGS. 5-7, which lane the vehicle is in, environmental conditions (such as, for example, rain, snow, sleet, temperature, ambient light), and/or vehicle type/characteristics affect the speed ranges shown on display 510. In embodiments, computer device 100 compares the predetermined value of the vehicle passageway parameter (speed ranges) applicable to the area of road 855 associated with second information providing device 320 with a current vehicle value of the vehicle passageway parameter (speed) and lane position of vehicle 860. In embodiments, computer device 100 generates a command to illuminate acceptable speed range 512 on display 510 as a result of comparing the predetermined speed ranges applicable to the area of road 855 associated with second information providing device 320 with the current speed and lane position of vehicle 860. In embodiments, computer device 100 transmits to display 510 in vehicle 860 the command to illuminate acceptable speed range 512.

Figure 8:
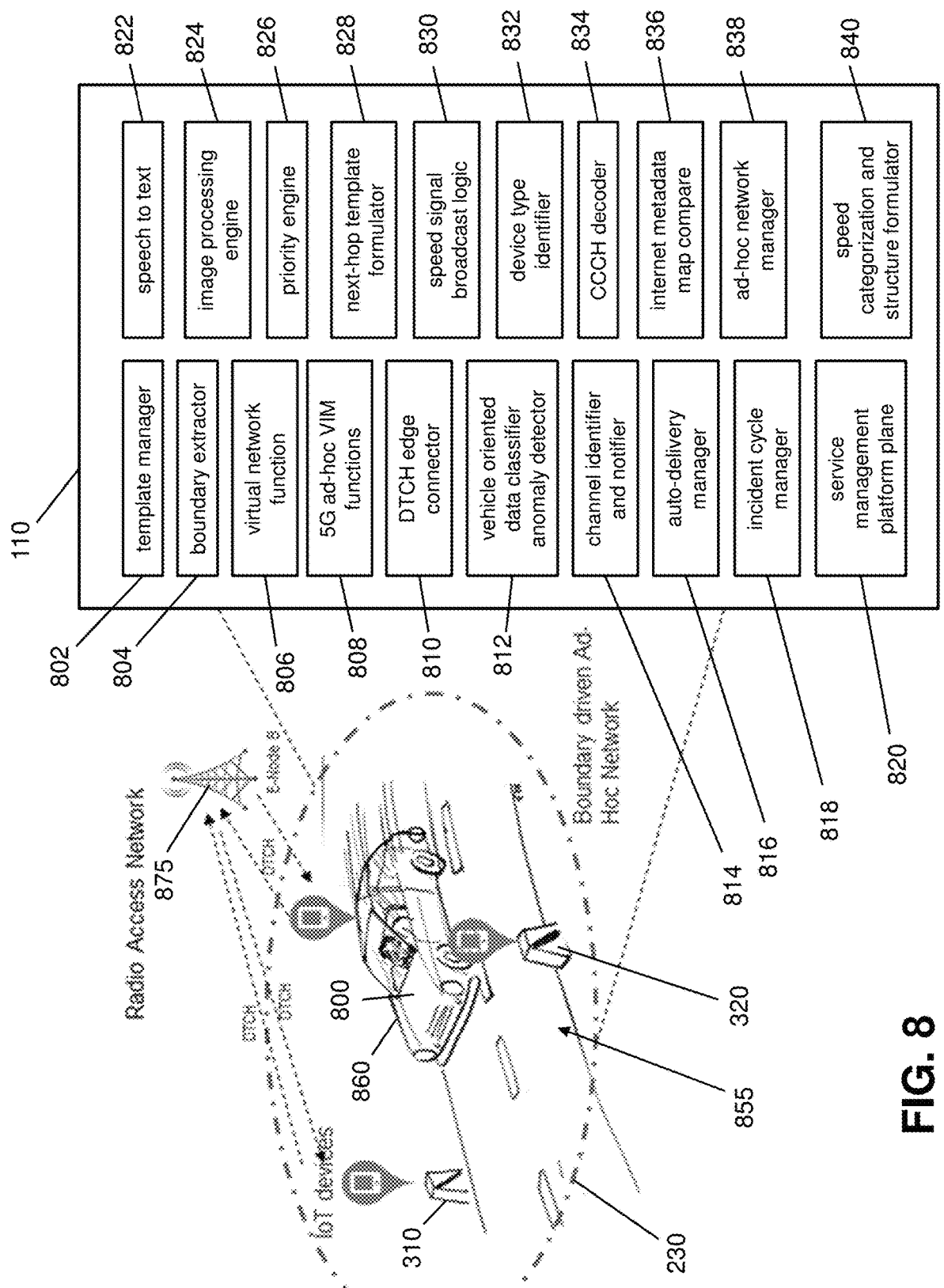
FIG. 8 shows an exemplary embodiment of the present invention.

FIG. 8 shows an example of a vehicle 860 operating on a vehicle passageway (road 855) in an ad-hoc network 230 in accordance with embodiments of the invention. A radio access network 875 such as, for example, 5G wireless network 200, communicates with vehicle 860 and one or more roadside devices 310, 320. In embodiments, a vehicle device 800 (for example computer device 100 in FIG. 4) in vehicle 860 and/or one or more of roadside devices 310, 320 are IoT devices. FIG. 8 also shows an example of traffic information module 110. An example of an implementation of an embodiment of the invention will now be discussed with reference to FIG. 8.

In this example, roadside devices 310, 320 continuously page for an ad-hoc network creation request from vehicle device 800 (for example computer device 100 in FIG. 4) in vehicle 860. Speed related information is gathered (over, for example, wireless network 200, and/or network 250 from external information sources 400) by one or more of roadside devices 310, 320. In embodiments, the speed related information is dependent on time of day, traffic density, and environmental conditions and is lane specific for one or more lanes of road 855. In embodiments, a dynamic speed limiter algorithm calculates optimum speeds (or speed limits) that are sent to the roadside devices (for example, speed limit signs). In embodiments, the speed limits control traffic speeds to minimize congestion and delays.

Vehicle device 800 broadcasts an ad-hoc network creation request over a 5G PCCH. When vehicle device 800 is located within the boundaries of the paging of roadside device 320, for example, roadside device 320 receives the network creation request. In embodiments, the network creation request includes a template data structure (for example, the template shown in FIG. 10) that comprises all of the 5G DTCH parameters required to establish an ad-hoc network in the form of a DTCH between vehicle device 800 and roadside device 320. In embodiments, vehicle device 800 receives the template data structure from a previous roadside device such as, for example, roadside device 310. The DTCH is established by vehicle device 800 upon receipt of the network creation request (including the template) by roadside device 320.

In embodiments, static data such as, for example, platform identification, hardware specification, and model internal architecture, is collected from a media access control (MAC) based service interconnect manager. Other examples of static data include speed supported by vehicle 860, the number of pistons in vehicle 860, and hardware default settings for vehicle device 800. In embodiments, the static data is parsed using a regex-based document classifier and saved in metadata mappers.

In embodiments, a DTCH broadcast message is generated by a physical network function (PNF) of network 200 which has embedded universal unique identifiers (UUIDs) for all vehicle devices (vehicle device 800 and any other vehicle devices) connected to roadside device 320 which sends the speed related information to the various vehicle devices. The DTCH broadcast message is transmitted over a radio bearer of network 200. In embodiments, the DTCH broadcast message includes details regarding the speed ranges that apply to an area around roadside device 320.

In embodiments, vehicle device 800 maps the details regarding the speed ranges with the current speed of vehicle 860, which is received from sensors in vehicle 860. In embodiments, vehicle device 800 receives real time dynamic lane data (the lane in which vehicle 860 is currently located) from a global positioning system (GPS) sensor and/or another sensor. Vehicle device 800 classifies the current speed and the lane data into one of the speed ranges shown in FIGS. 5-7 and transmits the classification to display 510 (or other display device) to articulate this information to the driver of vehicle 860. In embodiments, color instructions regarding the colors shown on display 510 are sent to display 510 using platform message queue (PLMQ) messages.

FIG. 8 shows an embodiment of traffic information module 110. In embodiments, the various modules shown in FIG. 8 are individual modules while in other embodiments some or all of the functions of the various modules are performed by fewer or more modules than are shown in FIG. 8. In the embodiment shown in FIG. 8, traffic information module 110 includes a template manager 802 that maintains proper template use based on the location of vehicle device 800. For example, a template "A" is to be used currently and for the next two miles, and then a template "B" is to be used after that. Boundary extractor 804 collects geographic boundary area information and sends the proper templates needed for subsequent roadside devices to vehicle devices in the current boundary area. Virtual network function (VFN) 806 locates dedicated bandwidth for information exchange between vehicle device 800 and roadside devices 310, 320. 5G ad-hoc virtualized infrastructure manager (VIM) functions 808 allows a 5G device (vehicle device 800) to allocate hardware resources. Dedicated traffic channel (DTCH) edge connector 810 establishes dedicated logical channel between devices such as, for example, vehicle device 800 and roadside devices 310, 320. Vehicle oriented data classifier anomaly detector 812 classifies data from received input and extracts the information that applies to vehicle 860. Channel identifier and notifier 814 identifies DTCHs that are DTCHs that is used by the current ad-hoc network. Auto-delivery manager 816 controls the delivery of data between devices such as, for example, vehicle device 800 and roadside devices 310, 320. Incident cycle manager 818 determines if a connection between, for example, vehicle device 800 and roadside device 310 is active. Service management platform plane 820 determines if a particular service is authorized.

Also shown in FIG. 8, speech to text 822 converts speech to text for use in vehicle device 800 for, for example, displaying an indication on a display in vehicle 860. Image processing engine 824 processes images of, for example, road 855 captured by an image capturing device on vehicle 860 to be used by Internet metadata map compare 836 to determine which lane vehicle 860 is occupying. Priority engine 826 decides the priority of communications with the various vehicles based on, for example, whether the particular vehicle is on an unacceptable speed range. Next-hop template formulator 828 works with template manager 802 to easily connect to the next roadside device by formulating the template needed to communicate with the next roadside device. Speed signal broadcast logic 830 collects information regarding the current speed of vehicle 860. Device type identifier 832 recognizes a vehicle type of vehicle 860 such as, for example, automobile versus truck. Common control channel (CCCH) decoder 834 decodes information regarding the CCCH, which ensures the data connection between vehicle device 800 and, for example, roadside device 310. Internet metadata map compare 836 compares information from image processing engine 824 to map data to determine which lane vehicle 860 is occupying. Ad-hoc network manager 838 manages the ad-hoc network created by vehicle device 800. Speed categorization and structure formulator 840 formulates the display that is shown on display 510.

Figure 9:
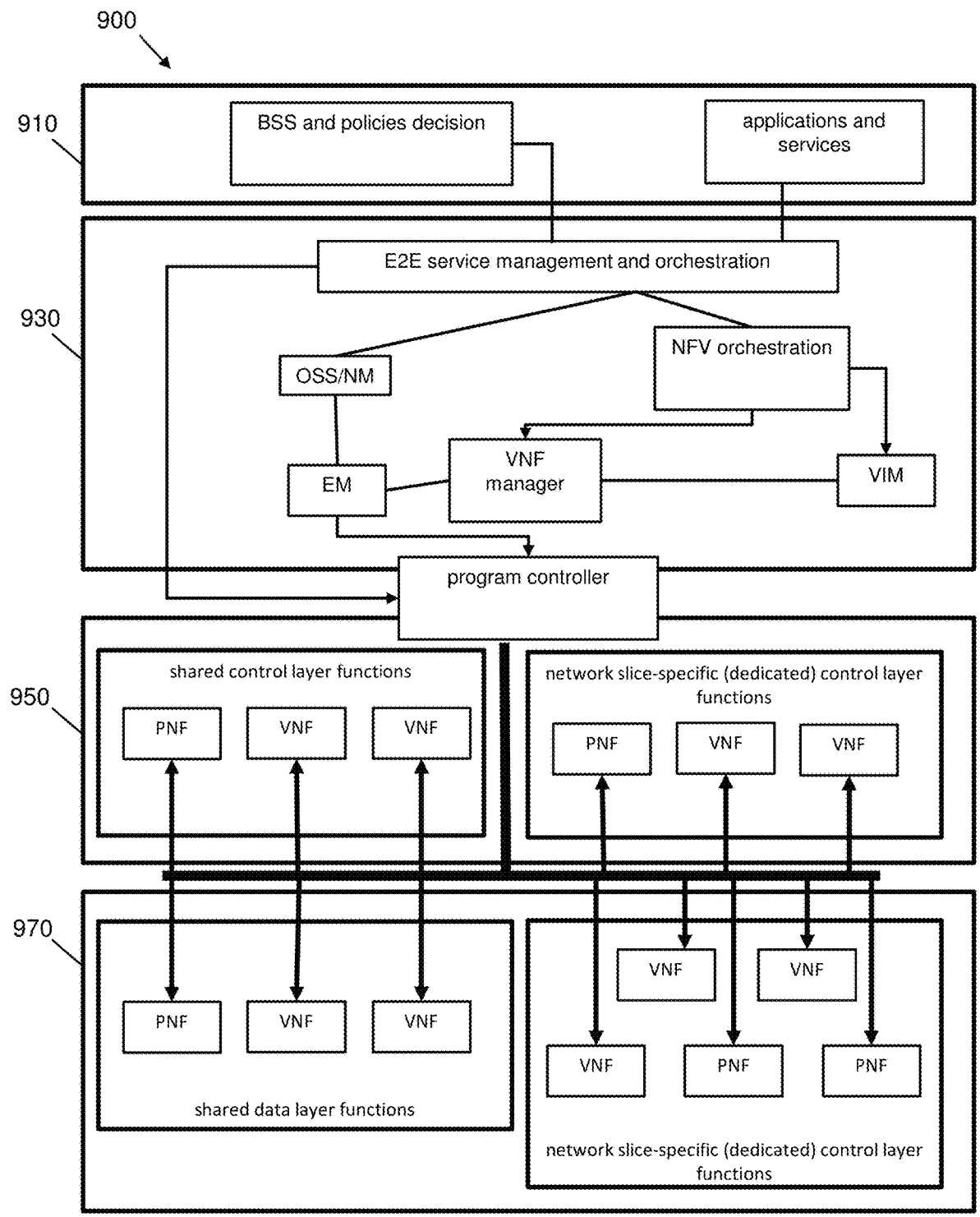
FIG. 9 shows exemplary 5G orchestration and network functions in accordance with embodiments of the present invention.

FIG. 9 shows an example of 5G orchestration and network functions 900 of a mobile network such as, for example, network 200. Functions 900 include a service plane 910, a management and orchestration plane 930, a control plane 950, and a data plane 970. In embodiments, data plane 970 accepts packets of information such as requests from information providing devices 310, 320 for information, such as speed limits and/or weather conditions, and forwards them to external information sources 400. In embodiments data plane 970 accepts packets of information, such as speed limits and/or weather conditions, from external information sources 400 and forwards them to one or more of information providing devices 310, 320. In embodiments, control plane 950 determines to where the packets of information accepted by data plane 970 are to be routed.

FIG. 10 shows an example of a sample DTCH parameter template 1000 in accordance with embodiments of the invention. Other embodiments use different parameters and/or different templates. In embodiments, vehicle device 800 (for example, computer device 100) receives template 1000 from first information providing device 310 and sends template 1000 to second information providing device 320 to facilitate a connection between vehicle device 800 and second information providing device 320 over ad-hoc network 230. In embodiments, template 1000 contains the DTCH parameters received by computer device 100 in step 1110 of FIG. 11, below.

Figure 11:
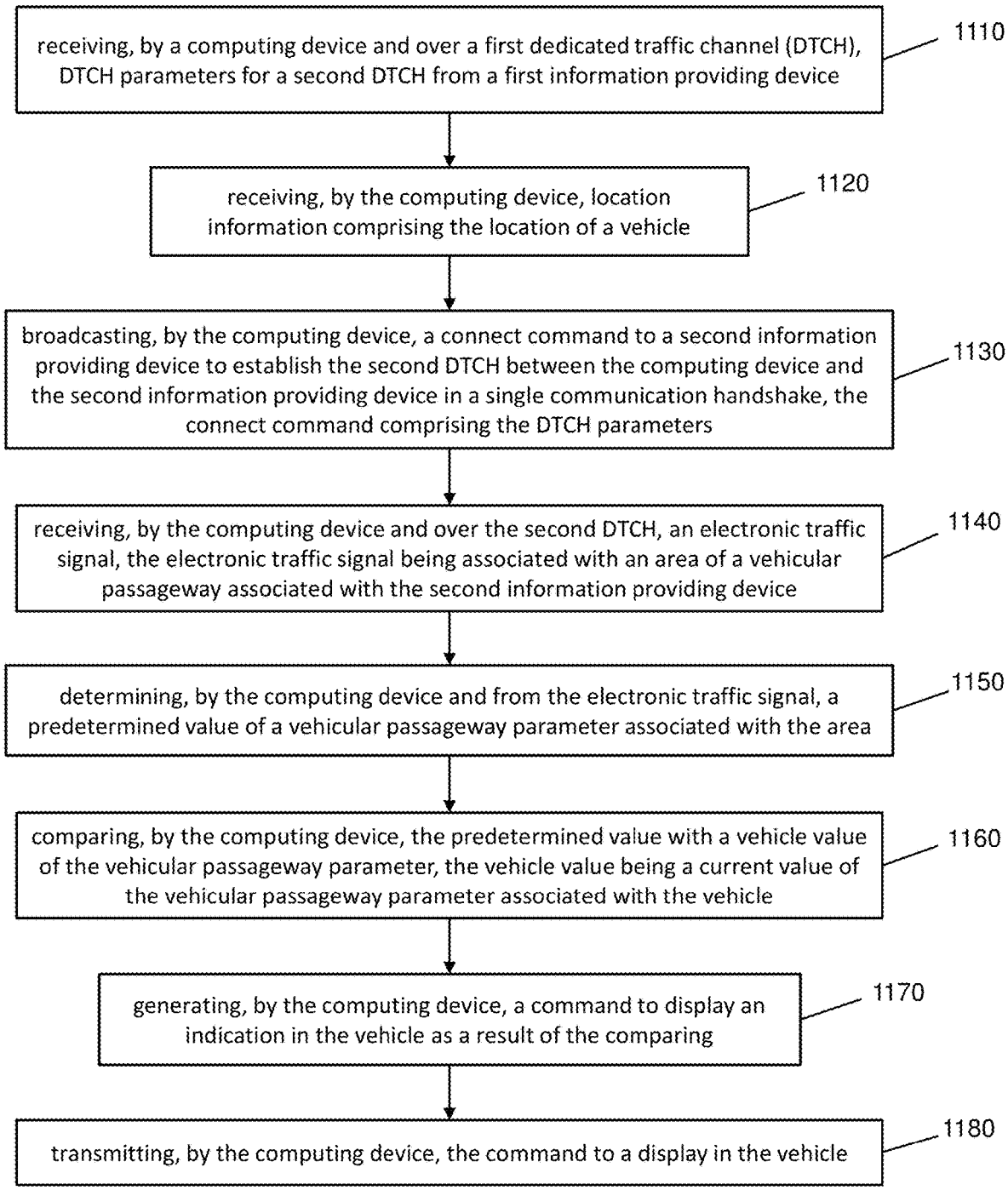
FIG. 11 shows a flowchart of an exemplary method in accordance with aspects of the invention.

FIG. 11 shows a flowchart of an exemplary method in accordance with aspects of the present invention. Steps of the method may be carried out in the environment of FIGS. 4 and 8 and are described with reference to elements depicted in FIGS. 4-8. As stated above, vehicle device 800 is an example of computer device 100 and is used interchangeably with computer device 100.

At step 1110, the system receives, by a computing device and over a first dedicated traffic channel (DTCH), DTCH parameters for a second DTCH from a first information providing device. In embodiments, and as described with respect to FIG. 4, computer device 100 receives DTCH parameters for connecting to roadside device 320 from roadside device 310.

At step 1120, the system receives, by the computing device, location information comprising the location of a vehicle. In embodiments, and as described with respect to FIG. 4, computer device 100 receives location information (for example, global positioning system location information) from external information sources 400 directly, over network 250, and/or over wireless network 200.

At step 1130, the system broadcasts, by the computing device, a connect command to a second information providing device to establish the second DTCH between the computing device and the second information providing device in a single communication handshake, the connect command comprising the DTCH parameters. In embodiments, and as described with respect to FIG. 4, computer device 100 broadcasts a connect command to second information providing device 320 to establish a second DTCH between computer device 100 and second information providing device 320 in a single communication handshake, the connect command comprising DTCH parameters stored in storage device 120.

At step 1140, the system receives, by the computing device and over the second DTCH, an electronic traffic signal, the electronic traffic signal being associated with an area of a vehicular passageway associated with the second information providing device. In embodiments, and as described with respect to FIGS. 4 and 8, computer device 100 receives, over the DTCH between computer device 100 and second information providing device 320, an electronic traffic signal that is associated with an area of road 855 associated with second information providing device 320.

At step 1150, the system determines, by the computing device and from the electronic traffic signal, a predetermined value of a vehicular passageway parameter associated with the area. In embodiments, and as described with respect to FIG. 4, computer device 100 determines from the electronic traffic signal received from second information providing device 320, predetermined speed ranges applicable to the area of road 855 associated with second information providing device 320.

At step 1160, the system compares, by the computing device, the predetermined value with a vehicle value of the vehicular passageway parameter, the vehicle value being a current value of the vehicular passageway parameter associated with the vehicle. In embodiments, and as described with respect to FIGS. 4 and 8, computer device 100 compares the predetermined speed ranges applicable to the area of road 855 associated with second information providing device 320 with a current speed of vehicle 860.

At step 1170, the system generates, by the computing device, a command to display an indication in the vehicle as a result of the comparing. In embodiments, and as described with respect to FIGS. 4-8, computer device 100 generates a command to illuminate speed range 512 on display 510 as a result of comparing the predetermined speed ranges applicable to the area of road 855 associated with second information providing device 320 with the current speed of vehicle 860.

At step 1180, the system transmits, by the computing device, the command to a display in the vehicle. In embodiments, and as described with respect to FIGS. 4-8, computer device 100 transmits the command to illuminate speed range 512 to display 510 in vehicle 860.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a computing device and over a first dedicated traffic channel, dedicated traffic channel parameters for a second dedicated traffic channel from a first information providing device, wherein the computing device establishes a network connection between the computing device and a second information providing device with the dedicated traffic channel parameters;
   broadcasting, by the computing device, a connect command to the second information providing device to establish the second dedicated traffic channel between the computing device and the second information providing device in a single communication handshake, the connect command comprising the dedicated traffic channel parameters;
   receiving, by the computing device and over the second dedicated traffic channel, an electronic traffic signal, the electronic traffic signal being associated with an area of a vehicular passageway associated with the second information providing device;
   determining, by the computing device and from the electronic traffic signal, a predetermined value of a vehicular passageway parameter associated with the area;
   comparing, by the computing device, the predetermined value with a vehicle value of the vehicular passageway parameter, the vehicle value being a current value of the vehicular passageway parameter associated with a vehicle;
   generating, by the computing device, a command to display an indication in the vehicle as a result of the comparing; and
   transmitting, by the computing device, the command to a display in the vehicle.

2. The method of claim 1, wherein the second dedicated traffic channel is established in an ad-hoc network.

3. The method of claim 1, wherein the second information providing device is a stationary device.

4. The method of claim 3, wherein the first information providing device is a stationary device.

5. The method of claim 1, further comprising receiving, by the computing device, location information comprising a location of the vehicle.

6. The method of claim 5, wherein the location information comprises a lane of the vehicular passageway in which the vehicle is located.

7. The method of claim 1, wherein the predetermined value comprises a predetermined lane value that is dependent on a lane of the vehicular passageway in which the vehicle is located.

8. The method of claim 1, wherein the indication comprises a first indication for a first lane of the vehicular passageway and a second indication for a second lane of the vehicular passageway, and the first indication and the second indication are different for a same value of the vehicular passageway parameter,
   wherein the vehicular passageway including the first lane and the second lane are along a same roadway, the first indication is associated with a travel speed for the first lane, and the second indication is associated with a different travel speed for the second lane, and
   wherein the network connection is a fifth generation (5G) cellular network transferring data associated with the vehicle from vehicle sensors.

9. The method of claim 1, wherein the second dedicated traffic channel is established directly between the computing device and the second information providing device.

10. The method of claim 1, further comprising transmitting, by the computing device, a command to produce a natural language audible message in the vehicle.

11. The method of claim 1, wherein the vehicular passageway parameter is a speed limit.

12. The method of claim 1, wherein the command is to display a first color on the display for a vehicle value less than the predetermined value, and to display a second color on the display for a vehicle value greater than the predetermined value.

13. The method of claim 1, wherein the command is to display a first color on the display for a vehicle value in a first range of values of the vehicular passageway parameter, and display a second color on the display for a vehicle value in a second range of values of the vehicular passageway parameter.

14. The method of claim 1, wherein the command is to display a first color on the display for a value of the vehicle value equal to a first value when the vehicle is located in a first lane of the vehicular passageway, and display a second color on the display for a value of the vehicle value equal to the first value when the vehicle is located in a second lane of the vehicular passageway.

15. A computer program product comprising one or more computer readable storage media having program instructions collectively stored on the one or more computer readable storage media, the program instructions executable to:
- receive, from a first information providing device and over a first dedicated traffic channel, dedicated traffic channel parameters for a second dedicated traffic channel, wherein a connection over the second dedicated traffic channel is established with the dedicated traffic channel parameters;
- broadcast a connect command to a second information providing device to establish the second dedicated traffic channel between a vehicle device and the second information providing device in a single communication handshake, the connect command comprising the dedicated traffic channel parameters;
- receive over the second dedicated traffic channel an electronic traffic signal, the electronic traffic signal being associated with an area of a vehicular passageway associated with the second information providing device;
- determine from the electronic traffic signal, a predetermined value of a vehicular passageway parameter associated with the area;
- compare the predetermined value with a vehicle value of the vehicular passageway parameter, the vehicle value being a current value of the vehicular passageway parameter associated with a vehicle; and
- generate a command to display an indication in the vehicle as a result of the comparing.

16. The computer program product of claim 15, wherein the second dedicated traffic channel is established in an ad-hoc network.

17. A system comprising:
- a processor, a computer readable memory, one or more computer readable storage media, and program instructions collectively stored on the one or more computer readable storage media, the program instructions executable to:
- receive a connect command from a vehicle device to establish a current dedicated traffic channel with the vehicle device in a single communication handshake, the connect command establishes an ad-hoc network connection over the current dedicated traffic channel with dedicated traffic channel parameters;
- establish the current dedicated traffic channel;
- transmit over the current dedicated traffic channel an electronic traffic signal, the electronic traffic signal being associated with an area of a vehicular passageway and comprising a predetermined value of a vehicular passageway parameter associated with the area; and
- transmit, over the current dedicated traffic channel, dedicated traffic channel parameters for a subsequent dedicated traffic channel.

18. The system of claim 17, wherein the current dedicated traffic channel is established between the vehicle device and a roadside device.

19. The system of claim 17, wherein the connect command is received over a dedicated control channel.

20. The system of claim 17, wherein the predetermined value comprises a different value for each of two different lanes of the vehicular passageway.

* * * * *